United States Patent
De Luca et al.

(10) Patent No.: US 9,228,610 B2
(45) Date of Patent: Jan. 5, 2016

(54) SUPPORT BEARING FOR A ROLL

(71) Applicant: Danieli & C. Officine Meccaniche Spa, Buttrio (IT)

(72) Inventors: Andrea De Luca, Remanzacco (IT); Alfredo Poloni, Fogliano di Redipuglia (IT)

(73) Assignee: Danieli & C. Officine Meccaniche Spa, Buttrio (IT)

( * ) Notice: Subject to any disclaimer, the term of this patent is extended or adjusted under 35 U.S.C. 154(b) by 0 days.

(21) Appl. No.: 14/356,667

(22) PCT Filed: Nov. 7, 2012

(86) PCT No.: PCT/IB2012/002259
§ 371 (c)(1),
(2) Date: May 7, 2014

(87) PCT Pub. No.: WO2013/068810
PCT Pub. Date: May 16, 2013

(65) Prior Publication Data
US 2014/0321788 A1 Oct. 30, 2014

(30) Foreign Application Priority Data

Nov. 8, 2011 (IT) .............................. UD2011A0177

(51) Int. Cl.
| | |
|---|---|
| F16C 33/34 | (2006.01) |
| F16C 33/46 | (2006.01) |
| F16C 33/36 | (2006.01) |
| F16C 13/02 | (2006.01) |
| F16C 33/52 | (2006.01) |
| F16C 19/26 | (2006.01) |

(52) U.S. Cl.
CPC ................ *F16C 33/366* (2013.01); *F16C 13/02* (2013.01); *F16C 19/26* (2013.01); *F16C 33/34* (2013.01); *F16C 33/4682* (2013.01); *F16C 33/52* (2013.01)

(58) Field of Classification Search
CPC ......... F16C 13/02; F16C 33/36; F16C 33/366
USPC .......................... 384/565, 568, 572, 578, 579
See application file for complete search history.

(56) References Cited

U.S. PATENT DOCUMENTS 525,336 A * 9/1894 Williams ......................... 477/27
557,052 A * 3/1896 Woodcock ................. 114/145 R
(Continued)

FOREIGN PATENT DOCUMENTS

DE 102008005376 A1 7/2009
EP 1826424 A2 8/2007
(Continued)

OTHER PUBLICATIONS

PCT Search Report and Written Opinion dated Mar. 19, 2013 of Patent Application No. PCT/IB2012/002259 filed Nov. 7, 2012, 8 pages.

*Primary Examiner* — Phillip A Johnson
(74) *Attorney, Agent, or Firm* — Maine Cernota & Rardin

(57) ABSTRACT

Support bearing which comprises a first ring and a second ring disposed inside the first ring and substantially coaxial thereto. The first ring and the second ring define between them an annular hollow space in which a cage structure is disposed comprising two circular crowns disposed distanced from each other and between which a plurality of rolling elements are disposed, provided to allow the reciprocal rotation of the first ring and the second ring. The bearing is suitable to support a roll which is used particularly, but not exclusively, in coating processes of a metal product, such as for example strip, wire, bars, by means of metal coating methods such as those known such as galvanization, aluminizing or other similar coating processes.

17 Claims, 4 Drawing Sheets

(56) References Cited

U.S. PATENT DOCUMENTS 803,625 A * 11/1905 Reynolds et al. ............ 384/579
818,919 A *  4/1906 Scheiffler .................... 384/579

FOREIGN PATENT DOCUMENTS

| JP | 08-028575 | 2/1996 |
| JP | 2006-177485 | 6/2006 |

* cited by examiner

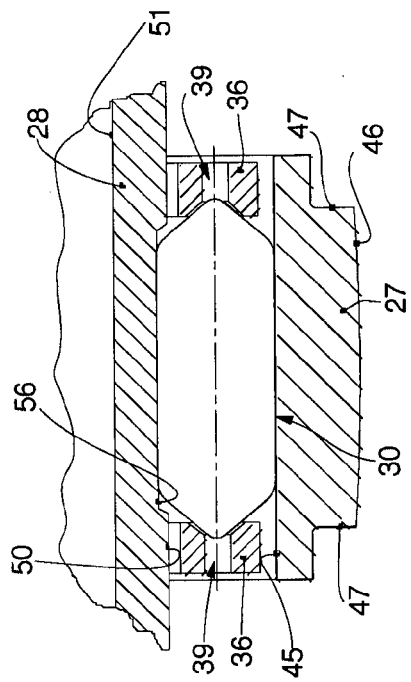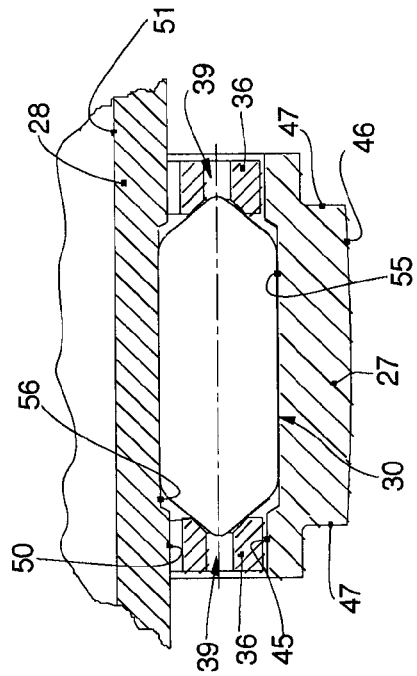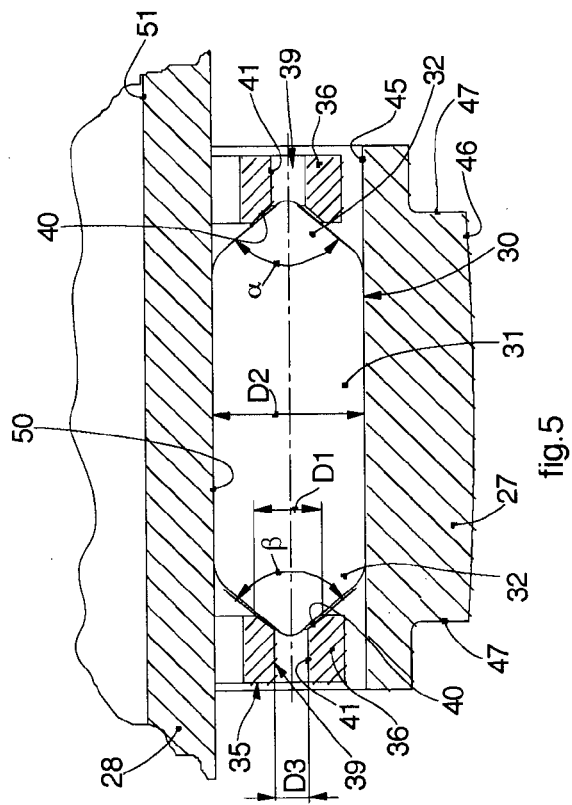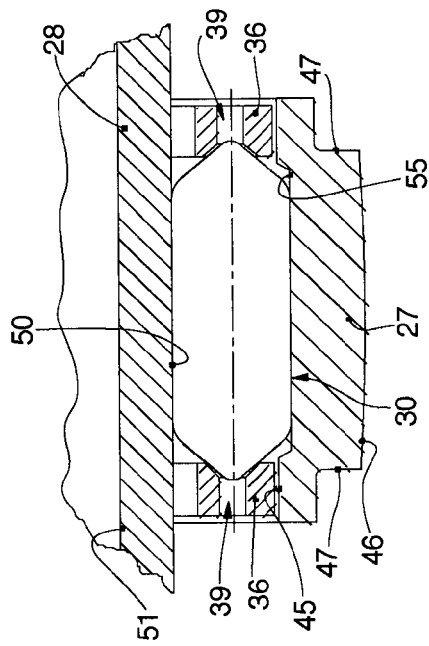

SUPPORT BEARING FOR A ROLL

RELATED APPLICATIONS

This application is a national phase application filed under 35 USC §371 of PCT Application No. PCT/IB2012/002259 with an International filing date of Nov. 7, 2012, which claims priority to Italian Application No. UD2011A000177, filed Nov. 8, 2011. Each of these applications is herein incorporated by reference in their entirety for all purposes.

FIELD OF THE INVENTION

The present invention concerns a support bearing for a roll which is used particularly, but not exclusively, in processes for coating a metal product, such as for example a strip, a wire, a bar, by means of metal coating methods such as the known galvanization or aluminizing processes or other similar coating processes.

In particular, the bearing is suitable to support one or more rolls on which the metal product to be coated rests during transit or is partly wound. Both the roll and the bearing are totally immersed, or a large part of them, in the bath of coating material and the strip is made to move forward continuously through the bath.

BACKGROUND OF THE INVENTION

Coating processes for metal surfaces are known, in particular for strip, wire or metal bars, using a coating metal such as for example zinc, aluminum, tin, lead or a combination thereof, or other metal materials.

In the following description reference will be made to the specific case of coating a metal strip even if this does not exclude that the present invention can also be applied to other types of metal products such as for example bars, wire or other.

The coating processes provide to immerse the strip in a molten bath of coating metal, obliging it to wind under a certain tension at least partly around a roll that is supported at its two ends by respective support bearings.

Both the roll and the bearings are completely immersed in the metal bath by a support arm. Upstream and/or downstream of the winding roll, also immersed in the bath, there may also be other pairs of traction and/or guide rolls.

Various solutions are known of bearings used in the state of the art. For example a solution is known in which each of the support bearings comprises a first external ring that is located in a housing seating associated with the support arm, a second ring disposed inside the first, which is mounted on an end pin of the roll, and a plurality of rolling elements, substantially cylindrical in shape, disposed parallel to each other in the interspace defined between the first and second ring.

A cage-type containing structure, also interposed between the first and second ring, supports the rolling elements during use, and keeps them with their respective axes parallel to the axis of rotation of the roll.

In the specific case of coating processes with metal, the different parts of the bearings are subjected to a high level of wear, which entails the need for frequent interventions to replace them, and consequently the plant must be stopped.

The geometry and wear of the bearing may cause the rolling elements to seize, and therefore also the bearing and the roll, which in turn, being prevented from rotating, damages the surface of the strip to be coated and generates in the strip unwanted vibrations that entail a non-uniform thickness of the metal coating that is applied.

The thinner the metal strip to be coated, the more serious this disadvantage is. In fact, a thin strip is kept under tension with a lower value than a strip with a greater thickness. In this case, in fact, a sufficient reciprocal friction force between roll and strip is not guaranteed, which is necessary to overcome the resistance torque exerted by the bearing, with consequent slipping that damages the surface.

As the thickness of the strip to be coated increases, the greater the tension to which the strip is subjected, the greater are the stresses to which the bearing is subjected, and therefore the more rapid the process of wear will be.

These problems of wear are even more accentuated by the presence of impurities in the metal bath, also known as dross, consisting for example of intermetallic compounds such as oxides of Fe, Zn and Al. These compounds act on the parts of the bearing like abrasive powders which, entering between the interstices of the bearing, cause it to seize and also cause a rapid wear thereof.

Another disadvantage is that, due to the high reactivity of the molten coating metal into which they are immersed, and the high working temperatures, the various parts of the bearing are subjected to a rapid process of corrosion, which generates other impurities in the bath.

Another disadvantage is that the movement members of the strip, due to the friction that increases in the bearing, are subjected to an increase in the drawing power required to feed the strip forward.

From the Japanese patent JP-A-8028575, a bearing is known for the planetary gear of a reducer mechanism in which a support made of resin contains a plurality of rolls that are engaged by protuberances made on the inner walls of the support and small pits made at the two ends of each roll.

From the German patent DE-A-102008005376 a bearing is known with a structure consisting of two circular crowns held at a distance by connection elements and between which the rolling elements are located. Each end of each rolling element has a cylindrical shape and is housed in a corresponding radial seating made in one of the two circular crowns. Shaped elements contribute to define each radial seating and function as attachment members. The inner crown is provided with two raised parts, between which the rolling elements are held in position. This bearing has the disadvantage that the radial seatings for the ends of the rolling elements are indeed made through, but are completely occupied by the ends themselves, which are cylindrical. Indeed, the play between the cylindrical ends of the rolling elements and the corresponding cylindrical radial seatings is such as to allow the rotational motion of the first with respect to the second, but not such as to allow the passage and reflux of the coating liquid.

From the Japanese patent JP-A-2006-177485 a bearing is known that comprises a structure in which rolling elements are disposed, equidistant and radial, the ends of which are housed in the corresponding forms of the structure, allowing a certain play and hence the presence of lubricant.

From the European patent EP-A-1 826 424 a support bearing for a roll is known, suitable to be immersed in liquid metal, comprising a rotating internal bushing mounted coaxial on an end pin of the roll and in rotation inside an external bushing attached to a support arm. Clamping elements are also provided to prevent the bearing from exiting axially from its seating and from rotating in the seating.

One purpose of the present invention is to obtain a support bearing for a roll that can be used in an environment under severe functioning conditions, in particular from the viewpoint of chemical aggression and the high working temperature, and therefore has a long working life compared with bearings known in the state of the art.

Another purpose of the present invention is to obtain a bearing to support a roll which, during functioning, has a smaller resistant torque compared with known solutions.

Another purpose of the present invention is to obtain a roll associated with support members that allows over time to reduce the energy consumption needed to move the strip.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a support bearing for a roll is used in particular, but not only, to be immersed in a bath of liquid metal for example to carry out coating operations of a metal strip, for example using a galvanization or aluminizing method.

Two support bearings according to the present invention support a roll in its possible immersion applications in a bath of coating.

More specifically, the bearing comprises a first ring and a second ring disposed inside the first ring and substantially coaxial to the latter.

Between the first and the second ring, during use, an annular hollow space is defined into which a cage structure is disposed comprising two circular crowns disposed distanced from each other and between which a plurality of rolling elements are disposed, provided to allow the reciprocal rotation of the first ring and the second ring.

According to one feature of the present invention, the rolling elements are provided with a central body and with two tapered ends made in a single body with the central body. Here and in the following description by tapered we mean a progressive reduction of the section sizes of the ends starting from their point of connection with the central body.

The central body, according to various forms of embodiment, can be substantially cylindrical or rounded, possibly in this case connected with the tapered ends.

Moreover, the two circular crowns are provided with respective housing seatings each comprising a first portion facing toward the inner part of the cage structure and with which a corresponding tapered end of a rolling element cooperates, and a second portion with the shape of a substantially cylindrical through hole which extends from said first portion toward the outside of the cage structure.

The shape of the housing seatings is therefore designed so as to contain the ends of the rolling elements, allowing them to be housed with play inside them, and thus allowing to support the rolling elements.

In this way, the rolling elements are kept axially and radially constrained in the hollow space, between the first and the second ring, and can move slightly with respect to the housing seatings. Moreover, in this way it allows possible impurities which infiltrate the free space in the housing seatings to exit spontaneously through the through holes which each make up the second portion of each housing seating and therefore they do not block the rotation of the rolling elements. This allows to considerably increase the working life of the bearing, and therefore to reduce the frequency of plant downtimes for maintenance operations.

Moreover, according to another feature of the present invention, the ratio between the maximum contact diameter between each rolling element and the cage structure and the diameter of each rolling element is less than 0.75, preferably less than 0.60, even more preferably less than 0.50. These values allow to improve the performance of the bearing according to the present invention, since they increasingly limit the resistant moment and therefore the friction between each rolling element and the cage, reducing the chances of the bearing seizing.

According to another feature of the present invention, the ratio between the minimum contact diameter between each of the rolling elements and the cage structure, which is equal to the diameter of each of the housing seatings, and the diameter of each of the rolling elements, is comprised between 0.01 and 0.5, preferably between 0.05 and 0.35, even more preferably between 0.1 and 0.25.

In one form of embodiment, the rolling elements are made of ceramic material, even though this does not exclude that they can also be made of metal, alloy or other.

The fact that rolling elements with tapered ends are provided also allows to reduce the contact surface with the respective housing seating with respect to a substantially cylindrical end and without variation of section with respect to the central body.

Moreover, the particular conformation of the rolling elements allows to reduce the friction force due to contact between the housing seating of the rolling elements and the rolling elements themselves.

Therefore, in accordance with other forms of embodiment it is possible to provide that the tapered ends have a shape chosen from a group comprising a rounded shape, a spherical dome and an elongated spherical dome.

In accordance with another form of embodiment, the tapered ends have a conical shape, possibly connected at the top, with an angle at the top comprised between 20° and 160°, preferably between 40° and 140°, more preferably between 60° and 120° and even more preferably between 80° and 100°. These angular values represent a compromise between the axial bulks and the contact diameters, keeping the rolling elements inside the cage structure. Indeed, larger angles, given the same length of the rolling element inserted inside the rings of the cage structure, would increase the contact diameter between each rolling element and the cage structure, while smaller angles would entail greater axial bulks, reducing excessively the contact diameter.

According to a further feature, the housing seating for the ends of the rolling elements is made through, through the two crowns of the cage structure; and in particular, in a preferred solution it comprises a first portion shaped in mating manner to the respective tapered end and a second portion which extends from the first portion toward the outside of each of the crowns.

This particular through conformation of the housing seatings allows possible particles which enter the free space in the housing seatings to be discharged directly through the second portion without any risk of their remaining confined inside the housing seating. This particular conformation allows to further increase the life of the bearing.

According to another feature, the hollow space defined between the first ring and the second ring has a size such as to allow to house the rolling elements inside the hollow space with play. Merely by way of example, the play which is defined between the rolling elements and first or second ring can vary from some tenths of a millimeter up to some millimeters.

The gap which is defined between the rolling element and the surface of the first ring and the second ring allows possible particles or impurities which can enter to not remain trapped inside blocking the reciprocal sliding of each of the rolling elements.

According to a variant embodiment, at least one of either the first or the second ring is provided with a contact surface with the rolling elements in which a circumferential groove is made, with a shape mating to at least the shape of the profile of the central body of the rolling elements.

The fact that a circumferential groove is provided allows to obtain a better guide of the rolling elements during the use of the bearing and to prevent an ample axial sliding of the rolling elements, impeding the exit of the cage structure and the rolling elements themselves.

According to another variant, the first ring and the second ring are provided respectively with an internal surface and an external surface, in both of which respective circumferential grooves are made, having a shape mating at least with the shape of the profile of the central body of the rolling elements and suitable to at least partly contain the latter and to at least partly constrain the axial sliding of the rolling elements with respect to the first and second ring.

In this case, the combination of the two grooves, on the inside ring and on the outside ring of the bearing, also allows to block any possible undesired axial movement of the roll. In fact, if the roll is supported at two ends by two support bearings according to the present invention, the two grooves prevent the flanks of the roll knocking against the bearings.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 5 shows an enlarged detail of FIG. 4;

FIG. 6 shows a first variant of FIG. 5;

FIG. 7 shows a second variant of FIG. 5;

FIG. 8 shows a third variant of FIG. 5:

Figure 1:
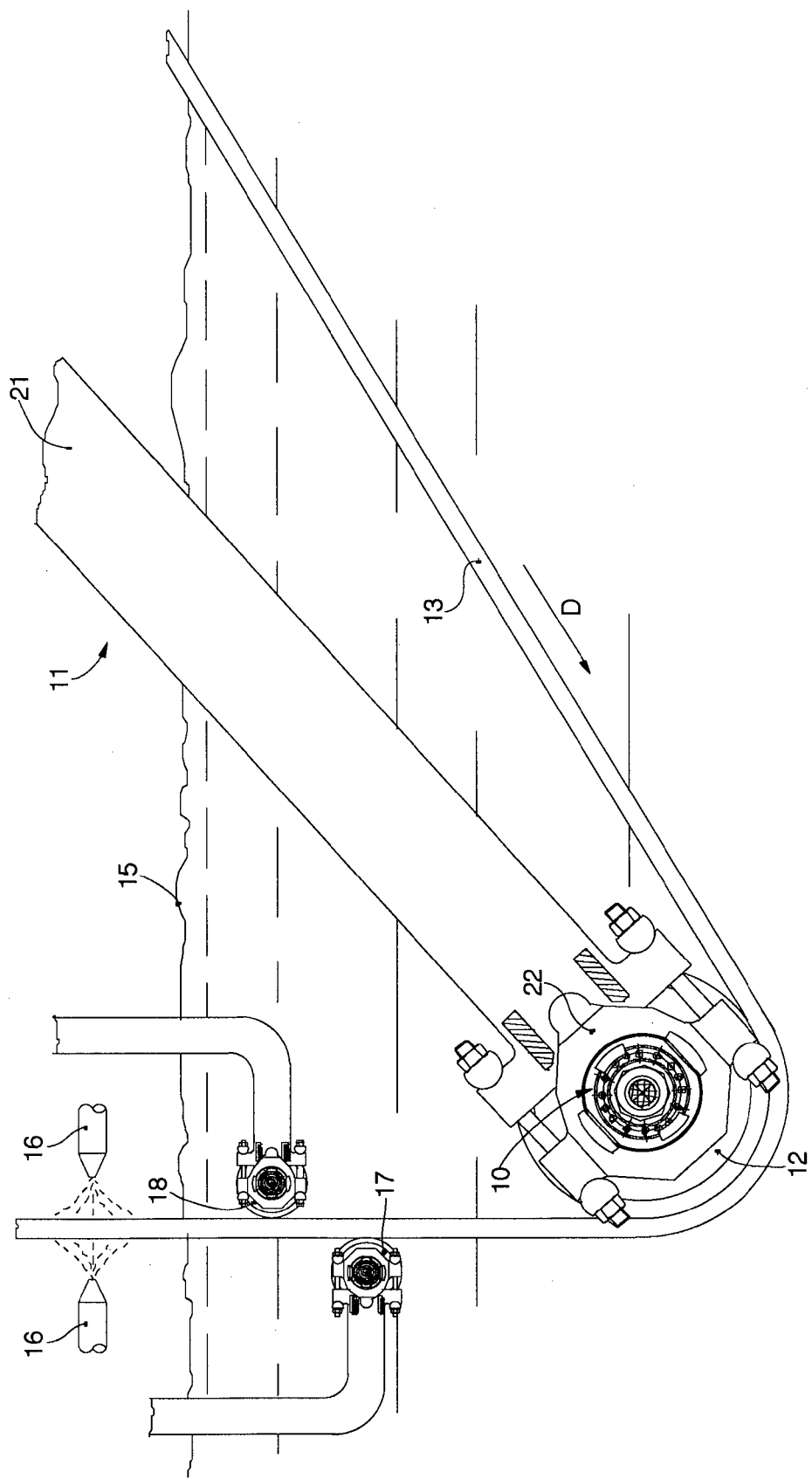
FIG. 1 is a schematic representation of a step of the process in which a support bearing for a roll according to the present invention is used.
Figure 2:
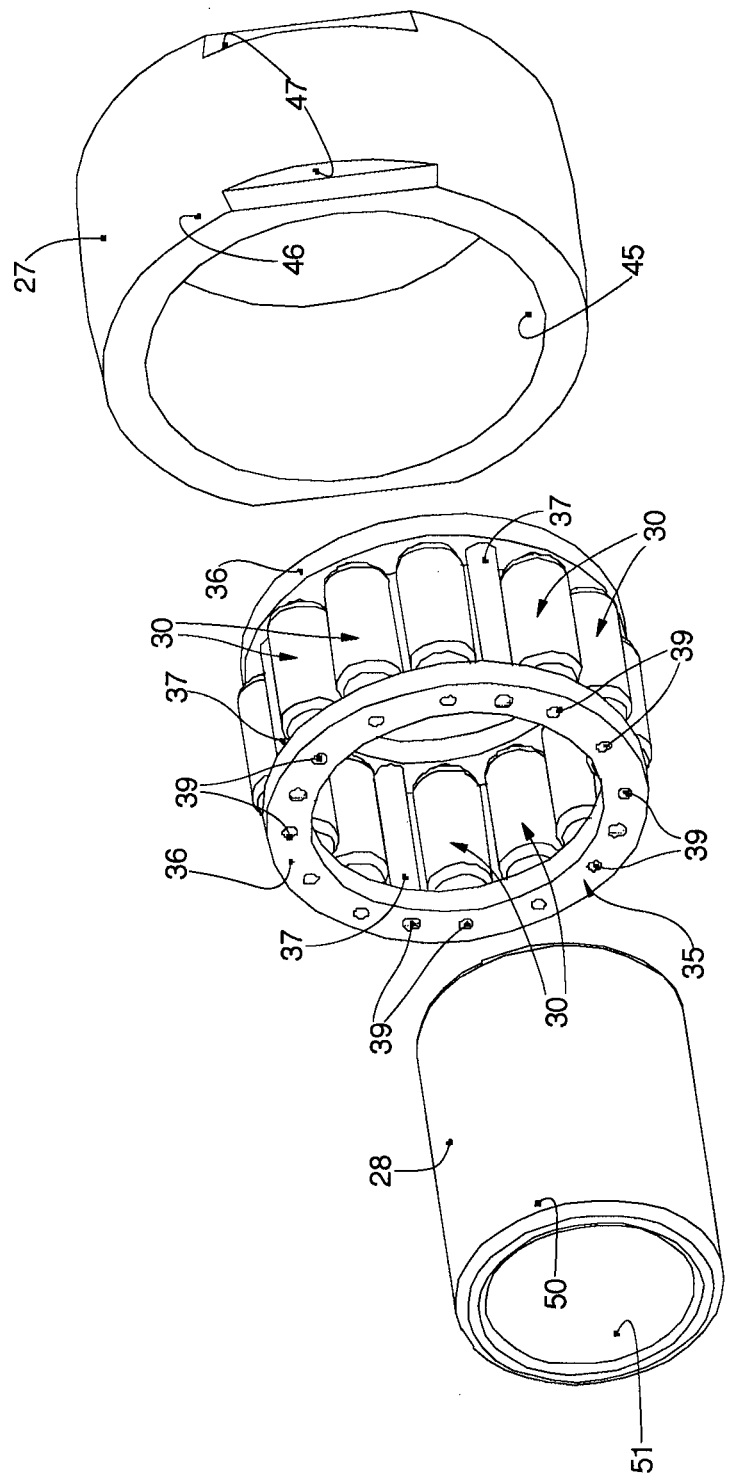
FIG. 2 is an exploded perspective view of a support bearing according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, a support bearing 10 according to the present invention is mounted on a support structure 11 and is associated with one or both ends of a roll 12 used for coating a metal strip 13 by means of at least partial immersion of the latter in a metal bath 15.

The strip 13, advancing continuously in the direction indicated by the arrow D, is immersed in the metal bath 15 making it wind at least partly around the roll 12.

More specifically, the strip 13 enters at an angle, in this case at about 30°, with respect to the free surface of the metal bath 15, and exits substantially vertical from it.

Two nozzles 16 are disposed outside the metal bath 15 and on both the sides of the strip 13 exiting from the metal bath 15, so as to emit a stream of gas which hits both surfaces of the strip 13 and provides to remove the excess metal which is deposited on its surfaces. The excess metal is discharged directly into the metal bath 15.

A first stabilizer roll 17 and a second stabilizer roll 18 are disposed downstream of the roll 12, in the direction indicated by the arrow D, and are provided to stabilize possible horizontal oscillations to which the strip 13 may be subjected during its movement.

The support structure 11 comprises a support arm 21 which extends into the metal bath 15 and to which, by means of threaded connection means 26 (FIGS. 3 and 4), a flange 22 is associated.

The support bearing 10 according to the present invention is mounted on the flange 22. In the following description the bearing 10 is applied on the roll 12, but it is not excluded that it can also be used on the stabilizer rolls 17 and 18.

In particular, the flange 22 is provided with a through hole 23 in which the bearing 10 is housed and with two protruding portions 24 each provided with a housing seating 25 for the connection of the threaded means 26.

The bearing 10 (FIGS. 2-5) according to the present invention comprises a first ring, in this case external 27, a second ring, in this case internal 28, which define a hollow space 29 between them in which a plurality of rolling elements 30 are disposed.

The rolling elements 30 (FIG. 5), which are advantageously but not necessarily made of ceramic material, have a substantially cylindrical central body 31 and two tapered or conical ends 32 which, from the central body 31, progressively narrow according to an angle at the top $\alpha$ which is comprised between 20° and 160°, preferably between 40° and 140°, more preferably between 60° and 120°, even more preferably between 80° and 100°, and in this case 90°.

In other forms of embodiment, the central body 31 can have a rounded or barrel shape, and substantially in continuation with the conical ends 32.

In other forms of embodiment it is possible to provide that the conical ends 32 have a different conformation, for example suitably rounded, like a spherical dome or elongated spherical dome shape, or with a portion connected to said central body 31.

The rolling elements 30 (FIG. 2) are preferably disposed distributed equally inside the hollow space 29 and with the respective longitudinal axes substantially parallel with respect to the axis of the external ring 27 and the internal ring 28.

The rolling elements 30 are associated with a cage structure 35 comprising two crowns 36 distanced from each other, and reciprocally joined by a plurality of spacer elements 37, in this case four.

The crowns 36 of the cage structure 35 are each provided with a plurality of through seatings 39, in number and position according to which the rolling elements 30 are disposed.

Each of the through seatings 39 (FIG. 5) has a first flared portion 40, made facing toward the internal part of the cage structure 35, and with an angle of flaring $\beta$ substantially equal to the angle at the top $\alpha$ of the conical ends 32 of the rolling elements 30.

Furthermore, the through seating 39 has a second portion 41 with a substantially cylindrical shape which extends from the first portion 40 toward the outside of the cage structure 35.

The two crowns 36 of the cage structure 35 are distanced from each other by a distance such as to allow the rolling elements 30 to be disposed in the respective through seatings 39 with a slight play, however such as to prevent the rolling elements 30, during functioning, from exiting the corresponding seating in which they are disposed.

Furthermore, the ratio between the maximum contact diameter D1 (FIG. 5) between each rolling element 30 and the cage structure 35 and the diameter D2 of each rolling element 30 is less than 0.75, preferably less than 0.60, even more preferably less than 0.50.

The ratio between the minimum contact diameter D3 between rolling element 30 and cage structure 35, which corresponds to the diameter of the housing seatings 39 and the diameter D2 of each rolling element 30, is comprised between 0.01 and 0.5, preferably between 0.05 and 0.35, even more preferably between 0.1 and 0.25.

Figure 4:
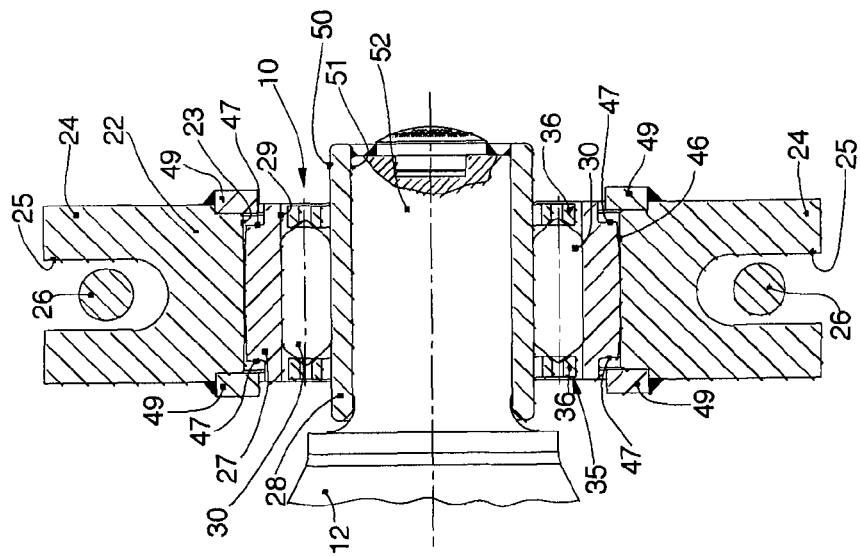
FIG. 4 is a section view from IV to IV of FIG. 3.

The external ring 27 is provided with an internal surface 45 along which the rolling elements 30 slide, and an external surface 46 which is inserted into the through hole 23 made in the flange 22 (FIG. 4).

The external surface 46 (FIG. 5) is rounded so as to have a maximum concavity in proximity to the intermediate point of its axial extension.

Figure 3:
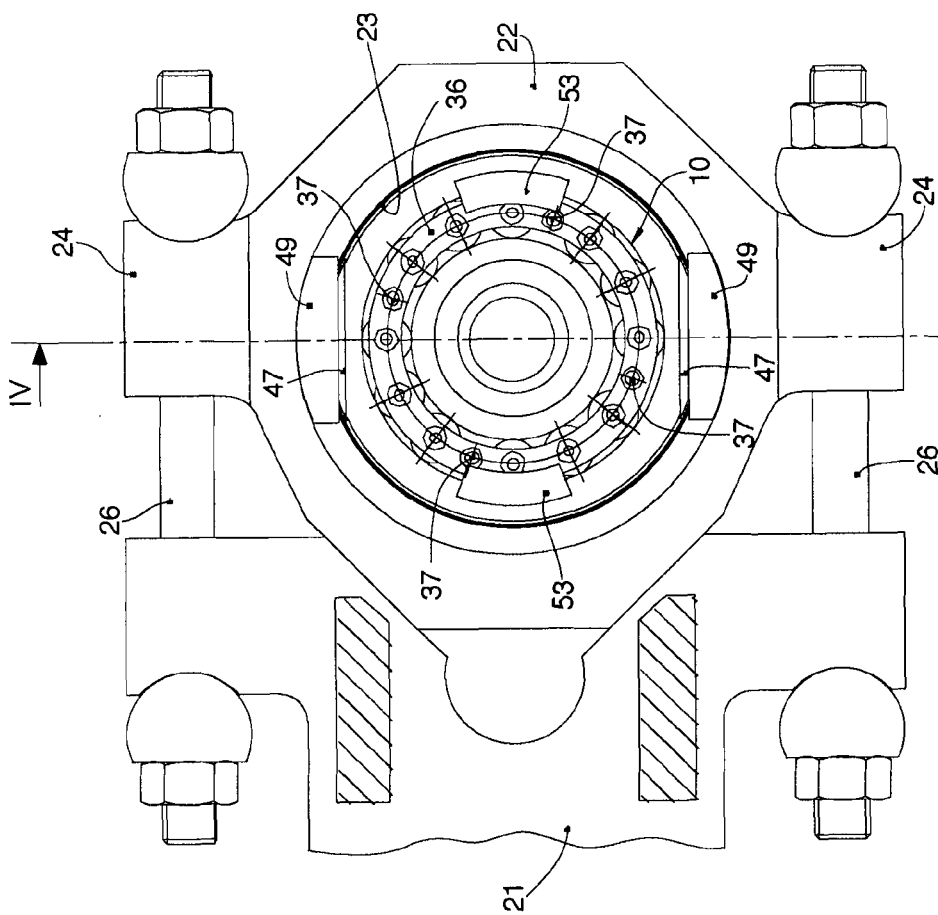
FIG. 3 is a representation of an enlarged detail of FIG. 1.

The external ring 27 (FIGS. 3-5) is also provided with two grooves 47 made circumferentially on two diametrically opposite zones in order to allow cooperation with first clamping elements 49 (FIGS. 3 and 4). The first clamping elements 49 are welded in proximity to the through hole 23 of the flange 22 to prevent the axial exit of the external ring 27 from the flange 22.

The roundness of the external surface 46 of the external ring 27 and the reciprocal play present between the first clamping elements 49 and the two grooves 47 allow the bearing 10 to partly adapt to the stresses to which the roll 12 is subjected during its functioning.

The internal ring 28 (FIGS. 4 and 5) also comprises an external surface 50 on which the rolling elements 30 are suitable to wind, and an internal surface 51 to which an end pin 52 of the roll 12 is associated. Suitable attachment means are disposed to constrain the axial sliding of the internal ring 28 with respect to the end pin 52.

According to another form of embodiment (FIG. 6), the external ring 27 is provided on its internal surface 45 with a circumferential groove 55 shaped substantially identical to the plan profile of the rolling elements 30.

According to another form of embodiment (FIG. 7), a circumferential groove 56, instead of being made on the external ring 27 as described with reference to FIG. 6, is made on the external surface 50 of the internal ring 28, and has a shape substantially coordinated with the plan profile of the rolling elements 30.

In the forms of embodiment described with reference to FIGS. 6 and 7, the circumferential grooves 56 or 57, as well as suitably guiding the rotation of the rolling elements 30 with respect to the external 27 and internal 28 rings, prevent an ample axial sliding of the rolling elements 30, impeding the exit of the cage structure 35 and therefore of the rolling elements 30.

In another form of embodiment (FIG. 8), both the internal surface 45 of the external ring 27, and also the external surface 50 of the internal ring 28 are provided respectively with a first 55 and a second circumferential groove 56.

The combination of the first circumferential groove 55 and the second circumferential groove 56 allows both to guide the rotation of the rolling elements 30 in a controlled way and also to prevent the exit of the cage structure 35 and the rolling elements 30, as well as blocking possible axial movements of the roll 12, thus preventing the flank of the roll 12 from knocking against the bearings with consequent damage.

In the latter case, the roll 12 is therefore kept in an axial position, limiting its axial movement which is substantially equal to the sum of the plays between the rolling elements 30 and the first 55 and the second circumferential groove 56, and between the tapered ends 32 of the rolling elements 30 and the respective housing seatings 39.

With reference to the form of embodiment shown with reference to FIGS. 4 and 5, in which no grooves are provided on the first 27 and second ring 28, second clamping elements 53 (FIG. 3) are associated with the external ring 27 which constrain the axial sliding of the cage structure 35, and therefore of the rolling elements 30 associated with it.

In particular, the second clamping elements 53 are shaped in a circular sector and are welded in proximity to the lateral surface 45 of the external ring 27, so as to protrude toward the hollow space 29 and constrain the cage structure 35.

In other forms of embodiment, not shown in the drawings, suitable clamping means can be provided to constrain the axial sliding of the cage structure 35. For example, it can be provided that the first clamping elements 49 extend beyond the thickness of the external ring 27 in order to prevent the exit of the cage structure 35.

In other forms of embodiment, not shown in the drawings, it can be provided that the external ring 27, on its internal surface 45, is provided with one or more circular sectors which extend in correspondence to the portion of internal surface 45 which is most stressed because of the tension to which the strip 13 is subjected.

The circular sectors are made of a material with a high resistance to wear, for example an alloy of tungsten-chrome-cobalt, also known as stellite, or with ceramic materials, and this allows to increase the useful life of the bearing 10.

The parts of the bearing 10 are made of material which is resistant to high temperatures and to wear.

Merely by way of example, the external ring 27, the internal ring 28 and the rolling elements 30 are made of a material chosen from a group comprising alloyed steels, stainless steels, alloys of tungsten-chrome-cobalt, also known as stellite, or ceramic materials.

It is clear that modifications and/or additions of parts may be made to the support bearing as described heretofore, without departing from the field and scope of the present invention.

It is also clear that, although the present invention has been described with reference to some specific examples, a person of skill in the art shall certainly be able to achieve many other equivalent forms of support bearing, having the characteristics as set forth in the claims and hence all coming within the field of protection defined thereby.

The invention claimed is:

1. A support bearing for a roll, said bearing comprising a first ring and a second ring disposed inside said first ring and substantially coaxial thereto, said first ring and said second ring defining between them an annular hollow space into which a cage structure is disposed comprising two circular crowns disposed distanced from each other and between which a plurality of rolling elements are disposed, provided to allow the reciprocal rotation of said first ring and said second ring, wherein said rolling elements are provided with a central body and with two tapered ends, and wherein said two circular crowns are provided with a plurality of housing seatings provided in order to allow the housing with play of said tapered ends inside said circular crowns, and to act as a support for said rolling elements, characterized in that each of said housing seatings comprises a first portion facing toward the internal part of said cage structure and with which one of said tapered ends of said rolling elements cooperates, and a second portion having the shape of a substantially cylindrical through hole which extends from said first portion toward the outside of said cage structure.

2. The bearing of claim 1, wherein said tapered ends have a conical shape with an angle at the top ($\alpha$) comprised between 20° and 160°.

3. The bearing of claim 2, wherein said first portion of each of said housing seatings is flared and has an angle of flaring ($\beta$) substantially equal to said angle at the top ($\alpha$) of each of said tapered ends.

4. The bearing of claim 1, wherein the ratio between the maximum contact diameter between each of said rolling elements and said cage structure and the diameter of each of said rolling elements is less than 0.75.

5. The bearing of claim 1, wherein the ratio between the minimum contact diameter between each of said rolling elements and said cage structure, which corresponds to the diameter of each of said housing seatings, and the diameter of each of said rolling elements is comprised between 0.01 and 0.5.

6. The bearing of claim 1, wherein said hollow space defined between said first ring and said second ring has a size such as to allow the housing with play of said rolling elements inside said hollow space.

7. The bearing of claim 1, wherein at least one of either said first ring or said second ring is provided with a contact surface with said rolling elements in which a circumferential groove is made, having a shape mating at least with the shape of the profile of said central body of the rolling elements.

8. The bearing of claim 1, wherein the first ring and the second ring are provided respectively with an internal surface and an external surface in both of which respective circumferential grooves are made, having a shape mating at least with the shape of the profile of the central body.

9. The bearing of claim 1, wherein clamping elements are provided to constrain the axial sliding of said cage structure.

10. The bearing of claim 1, wherein said tapered end has a shape chosen from a group comprising a rounded shape, a spherical dome and an elongated spherical dome.

11. The bearing of claim 1, wherein said rolling elements are made of ceramic material.

12. The bearing of claim 1, wherein said tapered ends have a conical shape with an angle at the top ($\alpha$) comprised between 40° and 140°.

13. The bearing of claim 1, wherein said tapered ends have a conical shape with an angle at the top ($\alpha$) comprised between 60° and 120°.

14. The bearing of claim 1, wherein said tapered ends have a conical shape with an angle at the top ($\alpha$) comprised between 80° and 100°.

15. The bearing of claim 1, wherein the ratio between the maximum contact diameter between each of said rolling elements and said cage structure and the diameter of each of said rolling elements is less than 0.50.

16. The bearing of claim 1, wherein the ratio between the minimum contact diameter between each of said rolling elements and said cage structure, which corresponds to the diameter of each of said housing seatings, and the diameter of each of said rolling elements is comprised between 0.05 and 0.35.

17. The bearing of claim 1, wherein the ratio between the minimum contact diameter between each of said rolling element and said cage structure, which corresponds to the diameter of each of said housing seatings, and the diameter of each of said rolling elements is comprised between 0.1 and 0.25.

* * * * *